Patented Dec. 18, 1923.

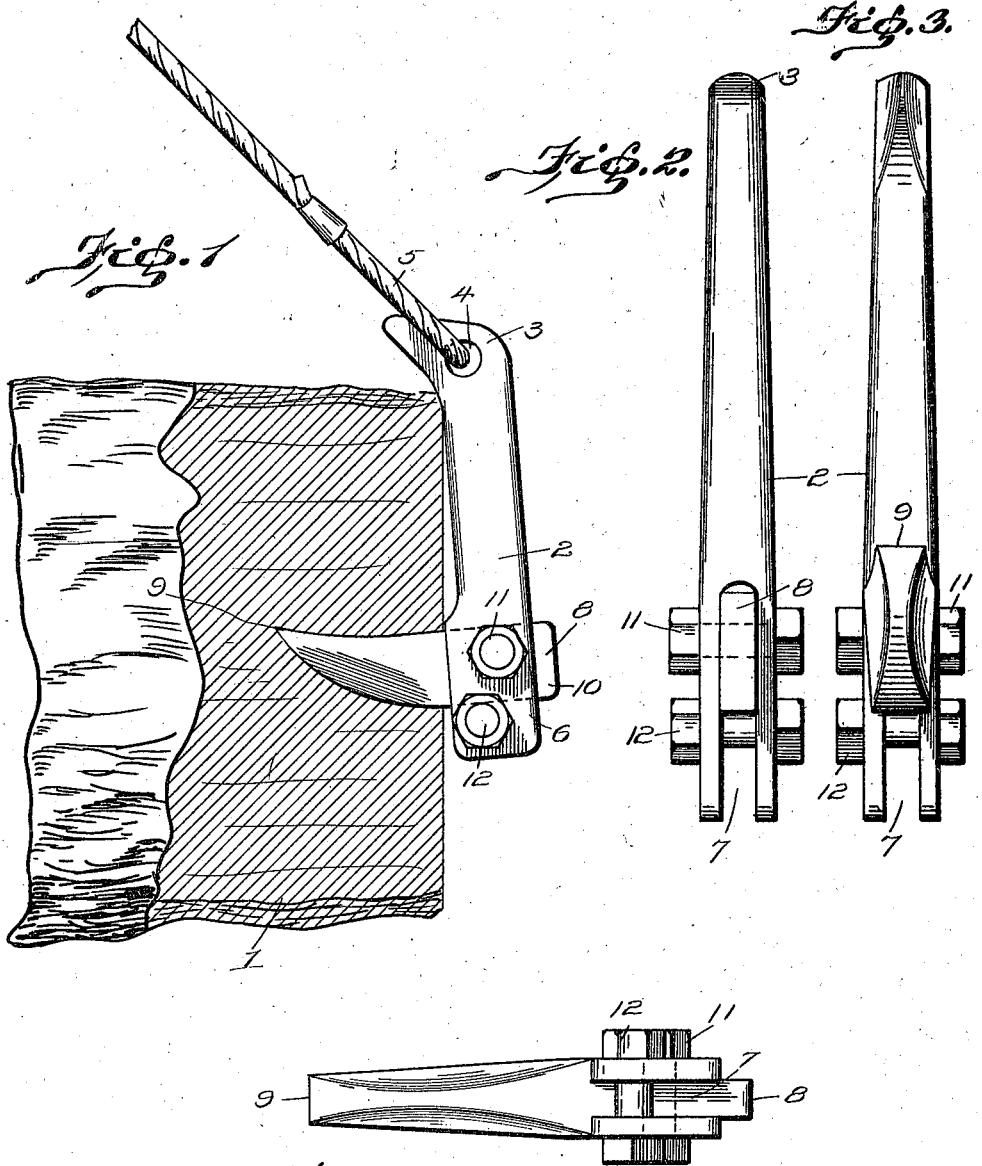

1,478,198

UNITED STATES PATENT OFFICE.

CHARLES H. BAISDEN, OF LOGAN, WEST VIRGINIA.

GRAB PICK.

Application filed April 25, 1922. Serial No. 556,493.

*To all whom it may concern:*

Be it known that I, CHARLES H. BAISDEN, a citizen of the United States, residing at Logan, in the county of Logan and State of West Virginia, have invented certain new and useful Improvements in Grab Picks, of which the following is a specification.

The invention has reference to improvements in grab picks and its object is to provide a pick which may be used in lumber operations or in lumber camps to facilitate the handling of the lumber.

As ordinarily constructed, grab picks are formed with a shank portion and a pick or point portion in one piece, but in driving such picks into the lumber, there is liability of breaking the shank or the pick, whereupon the whole device becomes useless.

In accordance with the present invention, the pick and the shank are formed in two pieces, one piece comprising the shank and the other piece comprising the pick which is secured to the shank by means of bolts or other fastening devices so that in case one part becomes broken it may be replaced by another part and the pick is restored to its original condition.

In accordance with the invention, the pick comprises a shank portion, a pick portion, and fastening devices by means of which the two parts may be secured together in operative condition.

The invention will be best understood from a consideration of the following detailed description taken in connection with the accompanying drawings forming part of this specification, with the understanding that the invention is not confined to any strict conformity to the showing of the drawings, but may be changed and modified so long as such changes and modifications mark no material departure from the salient features of the invention as expressed in the appended claims.

In the drawings:—

Figure 1 is a side elevation of a grab pick with a portion of the log with which the pick is engaged shown in section.

Fig. 2 is a rear elevation of the grab pick.

Fig. 3 is a front elevation of the grab pick.

Fig. 4 is a plan view of the grab pick.

Referring to the drawings, there is shown a log or piece of lumber 1, which may be taken as typical of any piece of lumber with which the grab pick is employed.

The grab pick comprises a shank portion 2 of elongated conformation with one end 3 provided with an eye 4 to receive one end of a cable 5 by means of which the grab pick is operated. The other end 6 of the grab pick shank 2 is bifurcated as indicated at 7 with the crotch of the bifurcation of sufficient dimensions to permit the passage of a pick member 8.

The pick or hook 8 has a point 9 at one end and a butt 10 at the other end, the pick being long enough to project a sufficient distance through the shank 2 to enter the log or piece of lumber 1 to an appropriate depth.

Traversing the bifurcation 7 are bolts 11, 12, respectively, the bolt 11 also traversing the basic end 10 of the hook 8, while the bolt 12 engages the basic end 8 to one side of the bifurcation so as to serve as a stop, bracing the pick 9.

In operation the pick or hook 8 is held firmly in place in the shank 2 by means of the two bolts 11 and 12 effectually preventing any displacement of the pick in operation.

The lodging grab pick is engaged in a log 1, and the workman drives the point 9 into the log by means of blows delivered thereto by a suitable sledge, hitting the butt end 8 of the point 9 with the sledge.

In order to separate the pick 9 from the shank 2, it is only necessary to remove the bolts 11 and 12 and the shank 2 or the pick 9 may be replaced by a new element, thereby restoring the pick to its original condition. In such case, the only replacement is the broken part at the expense only of such broken part thus making repairs relatively inexpensive.

What is claimed is:—

1. A logging tool of the class described comprising, a body member bifurcated at one end and provided at the other end with an aperture for an operating cable, a pick having a reduced head for insertion between the furcations, said head being flat to act as an anvil, and transverse bolts for retaining said pick in operative position.

2. A logging tool of the class described comprising, a vertical body member bifurcated at one end and having at its other end an eye for an operating cable, a pick having an upwardly inclined broad entering edge and a reduced head for insertion between said furcations and transversely extending bolts, one passing through the reduced head and the other passing beneath and acting to support the same.

3. A logging tool of the class described comprising a vertical body member bifurcated at one end and having at its other end an eye for an operating cable, a pick having an upwardly inclined broad entering edge, the lower side edges being concave, and a reduced head for insertion between said furcations, said head presenting a flat surface and extending beyond the body member, and a pair of transversely extending bolts one passing through the furcations and the head of the hook and the other passing through the furcations beneath the hook and out of alignment with the first mentioned bolt.

In testimony whereof, I affix my signature hereto.

CHARLES H. BAISDEN.